United States Patent
Zimmer et al.

(10) Patent No.: US 6,903,150 B2
(45) Date of Patent: Jun. 7, 2005

(54) RUBBER COMPOSITIONS CONTAINING AN ORGANICALLY MODIFIED CERAMIC

(75) Inventors: Rene Jean Zimmer, Howald (LU); Wolfgang Lauer, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 223 days.

(21) Appl. No.: 10/319,989

(22) Filed: Dec. 16, 2002

(65) Prior Publication Data

US 2004/0116589 A1 Jun. 17, 2004

Related U.S. Application Data

(60) Provisional application No. 60/341,172, filed on Dec. 13, 2001.

(51) Int. Cl.⁷ .............................. C08K 5/24; B60C 1/00
(52) U.S. Cl. ...................... 524/265; 524/394; 524/398; 524/399; 524/430; 524/437; 152/450; 152/525
(58) Field of Search ................................. 524/265, 394, 524/398, 399, 430, 437, 570, 571, 575; 152/450, 525

(56) References Cited

U.S. PATENT DOCUMENTS

| | | | |
|---|---|---|---|
| 5,858,526 A | 1/1999 | Floch et al. | 428/327 |
| 5,887,393 A | 3/1999 | Vanark et al. | 52/208 |
| 5,932,291 A | 8/1999 | Sayers et al. | 427/387 |
| 5,980,986 A | 11/1999 | Sayers et al. | 427/244 |
| 6,172,138 B1 * | 1/2001 | Materne et al. | 523/212 |
| 6,579,929 B1 * | 6/2003 | Cole et al. | 524/492 |
| 6,793,592 B2 * | 9/2004 | Sullivan et al. | 473/371 |

* cited by examiner

*Primary Examiner*—Peter D. Mulcahy
(74) *Attorney, Agent, or Firm*—John D. DeLong

(57) ABSTRACT

There is disclosed a rubber composition comprising:
(A) 100 parts by weight of at least one rubber containing olefinic unsaturation; and
(B) 1.5 to 50 phr of an organically modified ceramic.

17 Claims, No Drawings

RUBBER COMPOSITIONS CONTAINING AN ORGANICALLY MODIFIED CERAMIC

This application claims the benefit of provisional application Ser. No. 60/341,172 filed on Dec. 13, 2001.

BACKGROUND OF THE INVENTION

Organically modified ceramics, also known as ormocers, are inorganic/organic composites combining the properties of ceramics with those of organic components. Conventional uses of ormocers include phase separation processes including papermaking and filtration.

SUMMARY OF THE INVENTION

The present invention relates to rubber compositions containing an organically modified ceramic.

DETAILED DESCRIPTION OF THE INVENTION

There is disclosed a rubber composition comprising:

(A) 100 parts by weight of at least one rubber containing olefinic unsaturation; and (B) 1.5 to 50 phr of an organically modified ceramic.

In addition, there is disclosed a pneumatic tire having a rubber component when the rubber in said component is comprised of (A) 100 parts by weight of at least one rubber containing olefinic unsaturation; and (B) 1.5 to 50 phr of an organically modified ceramic.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, when the ormocer is used in a tread, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When the ormocer is used in a tread, the relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S—SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

When the ormocer is used in an innerliner compound, the preferred rubbers are natural rubber, SBR, halobutyl rubber, butyl rubber and mixtures thereof.

The term "phr" as used herein, and according to conventional practice, refers to "parts by weight of a respective material per 100 parts by weight of rubber, or elastomer."

Ormocers also referred to herein as organically modified ceramics are inorganic/organic composites combining the properties of ceramics with those of organic components. For the avoidance of doubt, the term ormocer used herein includes organically modified silicates. One example of an ormocer is an organosilane-impregnated silica gel which can be pyrolysed to form SiC-reinforced silica which is two to three times harder than the silica matrix alone.

The ormocers can be made by a typical sol-gel process. Gels are useful in that they have a good capacity to incorporate both organic and inorganic components and they allow very fine ormocer parties to be produced. Generally, sol-gel derived materials can be cast at room temperature.

An additional method of preparing an ormocer is by impregnating porous xerogels with organic monomers and then curing.

Typical ormocers are based on alumina, zirconia, titanium dioxide or silica-based organic network formers containing epoxy or methacrylate groups bonded to silicon atoms via a Si—C bond.

Either the network formers or work modifiers can be tailored for specific applications. For example, epoxysilanes may be used. Thermoplastic or photocurable groups based on diphenylsilanes or photocurable ligands, such as methacryl vinyl or allyl groups, in combination with a variety of polymerisable monomers may be used.

The ormocer may be used as is or coated on a surface of a substrate. The substrate may comprise ceramic glass, metal, carbon black, silica or rubber particles. Any suitable coating method may be employed for coating the substrate with the ormocer, such as immersion, spraying or roller or lick coating. The ormocer is then heated to a temperature in the order of 90° C. to 140° C., depending on the ormocer concerned, or is cured by ultra-violet radiation (e.g. wave lengths of 365 nm or 254 nm) to fix the ormocer onto the substrate.

The ormocers used in the present invention are preferably based upon polycondensates of one or more hydrolysable compounds of elements of main groups III and V and sub-groups II to IV, of the periodic table, such as boron, aluminum, silicon, tin, lead, titanium, zirconium, vanadium or zinc. The hydrolysable compounds ideally contain hydrolysable groups and non-hydrolysable carbon-containing groups in a molar ratio from 10 to 1 and 1 to 2 with respect to the monomeric starting materials. At least some of the non-hydrolysable carbon-containing groups ideally comprise fluorine atoms bonded to carbon atoms.

The compounds are made by mixing the require starting materials together in water for hydrolysis and pre-condensation. Any fluorine containing materials are, however, added after hydrolysis and pre-condensation of the other materials. After the fluorinated groups have reacted with the other materials, more water may be added. This method prevents the fluorinated materials separating out from the other materials so as to provide a two-phase system.

The hydrolysable groups referred to above preferably comprise one or more of the following: alkoxy, aryloxy, acyloxy, alkylcarbonyl halogen or hydrogen.

The non-hydrolysable groups referred to above preferably comprise one or more of the following: alkyl, alkenyl, alkynyl, aryl, alkaryl or alkoxy.

Examples of suitable starting materials include any of the following: $CF_3CH_2CH_2SiCl_2(CH_3)$, $CF_3CH_2CH_2SiCl(CH_3)_2$, $CF_3CH_2CH_2Si(CH_3)(OCH_3)_2$, $i\text{-}C_3F_7O\text{—}(CH_2)_3\text{—}SiCl(CH_3)$, $n\text{-}C_6F_{13}CH_2CH_2SiCl_2(CH_3)$, $n\text{-}C_6F_{13}CH_2CH_2SiCl(CH_3)_2$, $CF_3CH_2CH_2\text{—}SiY_3$, $C_2F_5CH_2CH_2\text{—}SiY_3$, $C_4F_9CH_2CH_2\text{—}SiY_3$, $n\text{-}C_{10}F_{21}CH_2CH_2\text{—}SiY_3$, $TiCl_4$, $Ti(OC_2H_5)_4$, $Ti(OC_3H_7)_4$, $Ti(O\text{-}i\text{-}C_3H_7)_4$, $Ti(OC_4H_9)_4$, $Ti(2\text{-ethylhexoxy})_4$, $ZrCl_4$, $Zr(OC_2H_5)_4$, $Zr(OC_3H_7)_4$, $Zr(O\text{-}i\text{-}C_3H_7)_4$, $Zr(OC_4H_9)_4$, $ZrOCl_2$, $Zr(21\text{-ethylhexoxy})_4$, $Al(OCH_3)_3$, $Al(OC_2H_5)_3$, $Al(O\text{—}N\text{—}C_3H_7)_3$, $Al(O\text{-}i\text{-}C_3H_7)_3$, $Al(OC_4H_9)_3$, $Al(O\text{-}i\text{-}C_4H_9)_3$, $Al(O\text{-sec-}C_4H_9)_3$, $AlCl(OH)_2$, $Si(OCH_3)_4$, $Si(OC_2H_5)$, $Si(O\text{-}n\text{-}C_3H_7)_4$, $Si(O\text{-}i\text{-}C_3H_7)_4$, $Si(OC_4H_9)_4$, $SiCl_4$, $HSiCl_3$, $Si(OOCCH_3)_4$, $CH_3\text{—}SiCl_3$, $CH_3\text{—}Si(OC_2H_5)_3$, $C_2H_5\text{—}SiCl_3$, $C_2H_5\text{—}Si(OC_2H_5)_3$, $C_3H_7\text{—}Si(OCH_3)_3$, $C_6H_5\text{—}Si(OCH_3)_3$, $C_6H_5\text{—}Si(OC_2H_5)_3$, $(CH_3O)_3\text{—}Si\text{—}C_3H_6\text{—}Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, $(i\text{-}C_3H_7)_3SiOH$, $CH_2\text{=}CH\text{—}COO\text{—}C_3H_7\text{—}Si(OCH_3)_3$, $CH_2\text{—}C(CH_3)\text{—}COO\text{—}C_3H_7\text{—}Si(OC_2H_5)_3$, $(C_2H_5O)_3Si\text{—}C_6H_4\text{—}NH_2$, $CH_3(C_2H_5O)_2Si\text{—}(CH_2)_4\text{—}NH_2$, $(C_2H_5O)_3Si\text{—}C_3H_6\text{—}NH_2$, $(CH_3)_2(C_2H_5O)Si\text{—}CH_2\text{—}NH_2$, $(C_2H_5O)_3Si\text{—}C_2H_6\text{—}CN$, $(CH_3O)_3Si\text{—}C_4H_8\text{—}SH$, $(CH_3O)Si\text{—}C_6H_{12}\text{—}SH$, $(CH_3O)_3Si\text{—}C_3H_6\text{—}SH$, $(CH_2H_5O)_3Si\text{—}C_3H_6\text{—}SH$, $(CH_3O)_3Si\text{—}C_3H_6\text{—}NH\text{—}C_2H_4\text{—}NH_2$, $(CH_3O)_3Si\text{—}C_3H_6\text{—}NH\text{—}C_2H_4\text{—}NH\text{—}C_2H_4\text{—}NH_2$, when Y is selected from the group consisting of $\text{—}OCH_3$, $OC_2H_5$ or $Cl$.

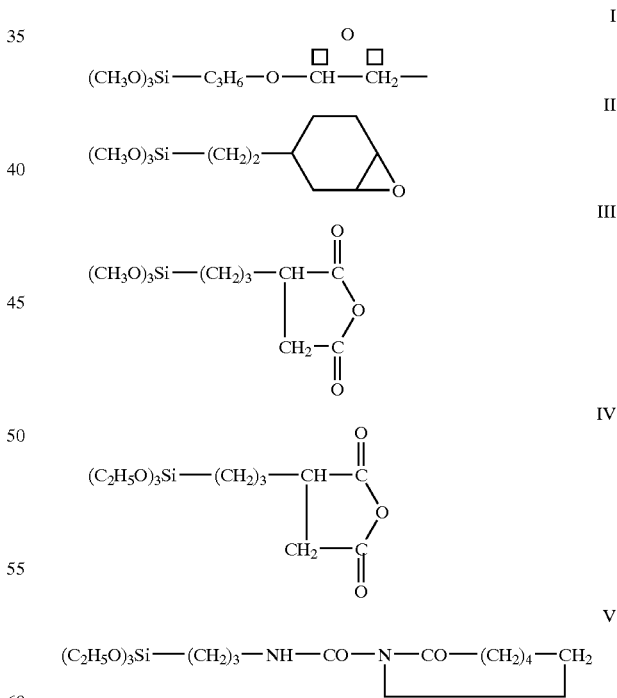

The amount of organically modified ceramic in the rubber may vary. For example, from 1.5 to 50 phr may be used. Preferably, from 8 to 45 phr is present in the rubber.

The rubber composition may additionally contain a conventional sulfur containing organosilicon compound.

Examples of suitable sulfur containing organosilicon compounds are of the formula:

$$Z\text{-Alk-}S_n\text{-Alk-}Z \qquad \text{VI}$$

in which Z is selected from the group consisting of

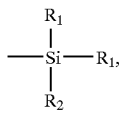 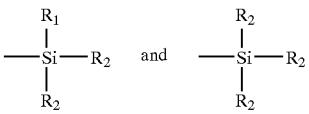 and 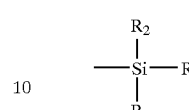

where $R_1$ is an alkyl group of 1 to 4 carbon atoms, cyclohexyl or phenyl; $R_2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis(tributoxysilylpropyl) disulfide, 3,3'-bis(trimethoxysilylpropyl)hexasulfide, 3,3'-bis(trimethoxysilylpropyl) octasulfide, 3,3'-bis(trioctoxysilylpropyl)tetrasulfide, 3,3'-bis(trihexoxysilylpropyl) disulfide, 3,3-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl) pentasulfide, 3,3'-bis(tricycloethoxysilylpropyl)tetrasulfide, 3,3'-bis(tricyclopentoxysilylpropyl)trisulfide, 2,2'-bis(tri-2"-methylcyclohexoxysilylethyl) tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl) disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene) tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl) sulfides. The most preferred compounds are 3,3'-bis(triethoxysilylpropyl)disulfide and 3,3'-bis(triethoxysilylpropyl) tetrasulfide. Therefore as to formula VI, preferably Z is

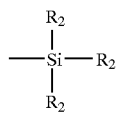

where $R_2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula VI in a rubber composition will vary depending on the level of other additives that are used. Generally speaking, the amount of the compound of formula VI will range from 0.5 to 20 phr. Preferably, the amount will range from 1 to 10 phr.

In the rubber of the present invention, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm$^3$/100 g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and silicon coupled oligomer are mixed in one or more non-productive mix stages. The terms "non-productive" and "productive" mix stages are well known to those having skill in the rubber mixing art. The silicon coupled oligomer may be added as a separate ingredient or in the form of a masterbatch. The rubber-composition containing the silicon coupled oligomer as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the silicon coupled oligomers is their solubility in organic solvents. This feature offers the opportunity to incorporate such silicon coupled oligomers into the elastomers via a number of ways aside from mechanical working in a mixer or extruder. For example, it is contemplated that one can disperse or dissolve the silicon coupled oligomers in a polymer cement (elastomer solubilized in an organic solvent) with mixing and removal of the solvent to yield a uniformly dispersed silicon coupled oligomers in the elastomer. In accordance with another embodiment, one can solubilize the silicon coupled oligomers in the organic solvent along with the monomer or monomers for subsequent solution polymerization. Under this embodiment, the monomers polymerize to form the elastomer in the silicon coupled oligomers media.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire.

The rubber composition containing the ormocers and rubber containing olefinic unsaturation may be incorporated in a variety of rubber components of the tire. For example, the rubber component may be a tread (including tread cap and tread base), sidewall, apex, chafer, sidewall insert, inner liner, wirecoat and ply coat. The rubber compound may also be used as a membrane that is applied to the outer side of the innerliner or between the innerliner and adjacent compound. Preferably, the compound is the tread. Such tires can be built shaped molded and cured by various methods which are known and are readily apparent to those having skill in such art.

The pneumatic tire of the present invention may be a passenger tire, motorcycle tire, aircraft tire, agricultural, earthmover, off-the-road, truck tire and the like. Preferably, the tire is a passenger or truck tire. The tire may also be a radial or bias, with a radial being preferred.

Upon vulcanization of the sulfur vulcanized composition, the rubber composition of this invention can be used for various purposes other than a tire. For example, the sulfur vulcanized rubber composition may be in the form of a belt or hose.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component where the rubber composition in said component is comprised of
   (A) 100 parts by weight of at least one rubber containing olefinic unsaturation; and
   (B) 1.5 to 50 phr of an organically modified ceramic wherein said organically modified ceramic is a polycondensate of one or more hydrolysable compounds of elements of main groups III and V and sub-groups II to IV of the periodic table.

2. The pneumatic tire of claim 1 wherein said tire is selected from the group consisting of passenger tires, motorcycle tires, aircraft tires, agricultural, earthmover, off-the-road and truck tires.

3. The pneumatic tire of claim 1 where said tire is a radial.

4. The pneumatic tire of claim 1 wherein said rubber component is selected form the group consisting of a tread cap, tread base, sidewall, innerliner, apex, chafer, membrane, sidewall insert, wirecoat and ply coat.

5. The pneumatic tire of claim 1, wherein said organically modified ceramic is a polycondensate of one or more hydrolysable compounds of an element selected from the group consisting of boron, aluminum, silicon, tin, lead, titanium, zirconium, vanadium and zinc.

6. The pneumatic tire of claim 5, wherein the hydrolysable compounds contain hydrolysable groups and non-hydrolysable carbon-containing groups in a molar ratio from 10 to 1 and 1 to 2 with respect to the monomeric starting materials.

7. The pneumatic tire of claim 6, wherein the hydrolysable groups are selected from the group consisting of alkoxy, aryloxy, acyloxy, alkylcarbonyl halogen and hydrogen, and the non-hydrolysable groups are selected from the group consisting of alkyl, alkenyl, alkynyl, aryl, alkaryl and alkoxy.

8. The pneumatic tire of claim 1, wherein the hydrolysable compound is selected from $CF_3CH_2CH_2SiCl_2(CH_3)$, $CF_3CH_2CH_2SiCl(CH_3)_2$, $CF_3CH_2CH_2Si(CH_3)(OCH_3)_2$, $i-C_3F_7O—(CH_2)_3—SiCl(CH_3)$, $n-C_6F_{13}CH_2CH_2SiCl_2(CH_3)$, $n-C_6F_{13}CH_2CH_2SiCl(CH_3)_2$, $CF_3CH_2CH_2—SiY_3$, $C_2F_5CH_2CH_2—SiY_3$, $C_4F_9CH_2CH_2—SiY_3$, $n-C_{10}F_{21}CH_2CH_2—SiY_3$, $TiCl_4$, $Ti(OC_2H_5)_4$, $Ti(OC_3H_7)_4$, $Ti(O-i-C_3H_7)_4$, $Ti(OC_4H_9)_4$, $Ti(2-ethylhexoxy)_4$, $ZrCl_4$, $Zr(OC_2H_5)_4$, $Zr(OC_3H_7)_4$, $Zr(O-i-C_3H_7)_4$, $Zr(OC_4H_9)_4$, $ZrOCl_2$, $Zr(21-ethylhexoxy)_4$, $Al(OCH_3)_3$, $Al(OC_2H_5)_3$, $Al(O—N—C_3H_7)_3$, $Al(O-i-C_3H_7)_3$, $Al(OC_4H_9)_3$, $Al(O-i-C_4H_9)_3$, $Al(O-sec-C_4H_9)_3$, $AlCl(OH)_2$, $Si(OCH_3)_4$, $Si(OC_2H_5)_4$, $Si(O-n-C_3H_7)_4$, $Si(O-i-C_3H_7)_4$, $Si(OC_4H_9)_4$, $SiCl_4$, $HSiCl_3$, $Si(OOCCH_3)_4$, $CH_3—SiCl_3$, $CH_3—Si(OC_2H_5)_3$, $C_2H_5—SiCl_3$, $C_2H_5—Si(OC_2H_5)_3$, $C_3H_7—Si(OCH_3)_3$, $C_6H_5—Si(OCH_3)_3$, $C_6H_5—Si(OC_2H_5)_3$, $(CH_3O)_3—Si—C_3H_6—Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, $(i-C_3H_7)_3SiOH$, $CH_2=CH—COO—C_3H_7—Si(OCH_3)_3$, $CH_2=C(CH_3)—COO—C_3H_7—Si(OC_2H_5)_3$, $(C_2H_5O)_3Si—C_6H_4—NH_2$, $CH_3(C_2H_5O)_2Si—(CH_2)_4—NH_2$, $(C_2H_5O)_3Si—C_3H_6—NH_2$, $(CH_3)_2(C_2H_5O)Si—CH_2—NH_2$, $(C_2H_5O)_3Si—C_2H_6—CN$, $(CH_3O)_3Si—C_4H_8—SH$, $(CH_3O)Si—C_6H_{12}—SH$, $(CH_3O)_3Si—C_3H_6—SH$, $(CH_2H_5O)_3Si—C_3H_6—SH$, $(CH_3O)_3Si—C_3H_6—NH—C_2H_4—NH_2$, $(CH_3O)_3Si—C_3H_6—NH—C_2H_4—NH—C_2H_4—NH_2$, when Y is selected from the group consisting of $—OCH_3$, $OC_2H_5$ or Cl,

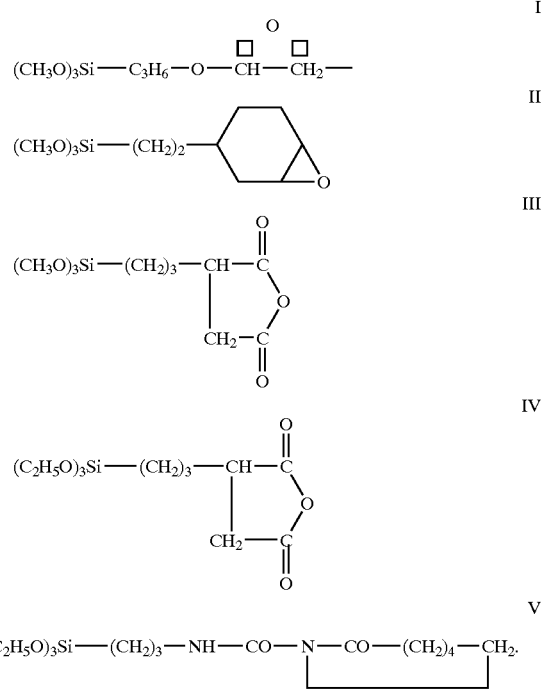

9. The pneumatic tire of claim 1, wherein the component is an innerliner.

10. The pneumatic tire of claim 1, wherein the component is an innerliner and the organically modified ceramic is disposed as a coating on a surface of the innerliner.

11. The pneumatic tire of claim 1, wherein the component is an innerliner, the rubbers is selected from natural rubber, SBR, halobutyl rubber, butyl rubber and mixtures thereof, and the organically modified ceramic is compounded into the rubber.

12. The pneumatic tire of claim 7, wherein the component is an innerliner.

13. The pneumatic tire of claim 7, wherein the component is an innerliner and the organically modified ceramic is disposed as a coating on a surface of the innerliner.

14. The pneumatic tire of claim 7, wherein the component is an innerliner, the rubbers is selected from natural rubber, SBR, halobutyl rubber, butyl rubber and mixtures thereof, and the organically modified ceramic is compounded into the rubber.

15. The pneumatic tire of claim 8, wherein the component is an innerliner.

16. The pneumatic tire of claim 8, wherein the component is an innerliner and the organically modified ceramic is disposed as a coating on a surface of the innerliner.

17. The pneumatic tire of claim 8, wherein the component is an innerliner, the rubbers is selected from natural rubber, SBR, halobutyl rubber, butyl rubber and mixtures thereof, and the organically modified ceramic is compounded into the rubber.

* * * * *